Figure 1:
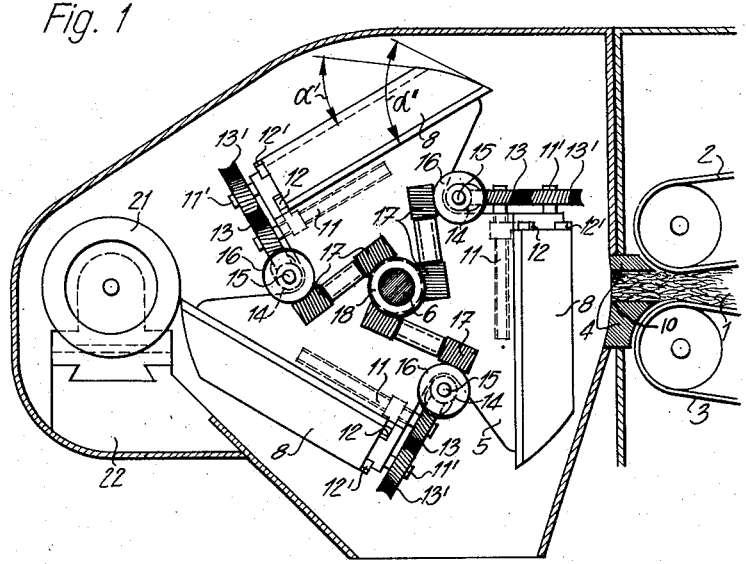

Aug. 19, 1958  W. RUDSZINAT  2,848,030
TOBACCO CUTTING MACHINE
Filed July 7, 1954

Inventor:
Willy Rudszinat
by Singer, Stern & Carlburg
Attorneys.

United States Patent Office 2,848,030
Patented Aug. 19, 1958

2,848,030
TOBACCO CUTTING MACHINE

Willy Rudszinat, Hamburg-Bergedorf, Germany, assignor to Kurt Körber & Co. K.-G., Hamburg-Bergedorf, Germany Application July 7, 1954, Serial No. 441,770

Claims priority, application Germany July 21, 1953

2 Claims. (Cl. 146—119)

The present invention relates to improvements in tobacco cutting machines with cutters provided on the periphery of a cylindrical cutter drum. It is known in such drum cutters to force the tobacco leaf material to be cut through a mouthpiece by means of conveyor belts or the like, this material being cut by a cutter drum rotating in front of the mouthpiece. The cutters used for this purpose are plate or blade cutters with cutting edges parallel to the cutter drum axis or also helically disposed cutters. Cutters are also known in which a steel strip is used on a cutter drum which is fed from a supply reel.

In order to permit a large cutting output it is necessary to feed the cutters continuously and to grind them after each cutting. Cutter drums in which the cutters are disposed helically on the periphery of the cutter drum are unsuitable for a continuous feed of the cutters. Further blade cutters fitted to the periphery of the cylindrical cutter drum of which the cutting edges are parallel to the cutter drum axis can be continuously fed forward during rotation corresponding to the grinding away of the cutter edges.

In order in this case to improve the cutting procedure it has already been proposed to dispose the cutter drum obliquely to the mouthpiece. The positional reversal namely arranging the cutter drum horizontally and the mouthpiece inclined to the horizontal has provided no useful results in cutting. The inclined positioning of the cutter drum has further the disadvantage that thereby the overall construction of the machine is more complicated and the machine is more expensive than with horizontally disposed cutter drums in which the grinding can be effected by known grinding devices. In order to avoid these disadvantages the cutters according to the invention are formed as blade cutters but they are so arranged on the drum that they are disposed obliquely to the cutter drum axis. The latter runs parallel to the forward edge of the lower mouthpiece jaw of the tobacco outlet as well as to the axis of a grinding wheel moving along the cutter edges. Thereby the cutters, seen perpendicularly from above have an oval or elliptical form as a result of the grinding operation performed parallel to the cutter drum axis and the cutting angle varies from one end side of the blade cutter progressively to the other. The feed of the inclined blade knife can be effected in common manner for example by two spindles disposed parallel one to the other and driven through known drives.

For cutting paper, card or the like, cutter drums running parallel one to the other with blade knives inclined to the cutter drum are known. The cutters are however not fed forward in such machines during the rotation of the cutter drum and also are not ground. The cutting edges have here, see perpendicularly from above a rectilinear formation. If the two opposed cutter drums each with inclined blade cutters co-operate one against the other, the inaccuracies occurring in this case need scarely be taken into account during the approximate movement of the cutting edges one against the other, but for cutting tobacco fibres this construction would not suffice since the tobacco would be torn during cutting and a variable fibre length would be obtained. In tobacco cutters the cutting edges must have instead of a straight theoretical correct form, an oval or elliptical form, in order that the stationary front edge of the mouthpiece jaw disposed parallel to the cutter drum axis must touch the rotating cutting edge at every point during the movement along said mouthpiece jaw. In order further that this cutter form shall be retained the cutters must be ground by a device which moves parallel to the cutter drum axis.

The invention is shown and described diagrammatically in one constructional example on the accompanying two figures for a tobacco cutting machine with a rotating cutter drum.

Figure 2:
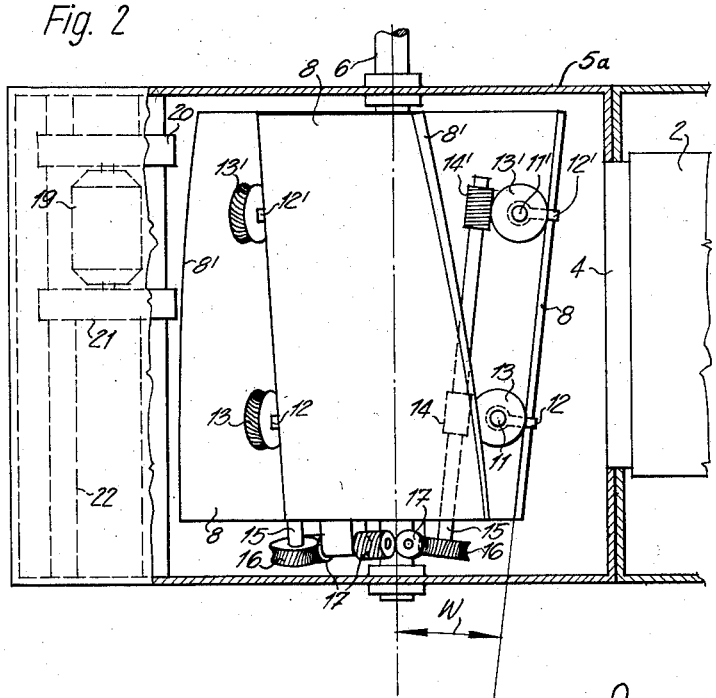

In the accompanying drawings:

Fig. 1 is a side view partly in section of the rotating cutter drum with the grinding device presented to the cutting knives, and Fig. 2 is a plan from above showing the housing partly broken away to illustrate various features of construction.

The tobacco leaves 1 are brought in known manner by conveyor belts 2 and 3 through a mouthpiece 4 towards a rotating cutter drum 5, which is supported on a shaft 6 conveniently in a frame 5a as shown in United States Patent 2,690,777 pivotally mounted in relation to the usual machine frame. In the frame 5a there is provided opposite to the mouthpiece 4 a grinding device with grinding wheels 20 and 21 which is movable in known manner on slides 22, along the cutting edges parallel to the cutter drum shaft 6.

On the periphery of the cutter drum there are located several blade cutters 8, in the present example three such cutters, which are inclined at an acute angle as shown in Fig. 2 at an angle W relatively to the cutter drum shaft 6. By the inclination of the cutters and by grinding parallel to the cutter drum shaft 6 the cutting edges 8' receive as shown in Fig. 2 an oval or elliptical form seen perpendicular to the plane of the blades. Thereby the cutter angle, that is the angle included between the cutter itself and a tangent from the drum periphery in the region of the cutting edge, varies as shown in Fig. 1 from the value $a'$ at one end of the cutter to the value $a''$ at the other end. The counter cutter edge 10 concerned, that is the forward edge of the lower jaw of the mouthpiece 4 likewise runs parallel to the cutter drum shaft 6 so that thereby at every point a good contact is present between the cutter edge 8' and the counter edge 10 on the mouthpiece jaw.

The blade cutters are driven in known manner as shown in United States Patent 2,751,949 for example each by two threaded spindles 11, 11' (see also Fig. 2) on which two half-nuts 12, 12' are disposed which engage for example behind the rear edges of the cutters. On the shank of each spindle is located a worm wheel 13, 13' in which a worm 14, 14' respectively engages. The worm wheel shaft 15 receives its drive through the wheel 16, the double worm shaft 17 and the worm wheel 18 which is mounted on the driving shaft 6 of the cutter drum 5.

The grinding device consists of a motor 19 the shaft of which carries two grinding wheels 20, 21. The motor rests on a slide 22 and is driven in known manner so that the grinding mechanism reciprocates along the cutting edges 8' of the cutters 8.

What I claim is:

1. In combination with a tobacco cutting machine including a rotary cutter drum element and an elongated horizontally extending mouthpiece arranged in parallel relation to the axis of said drum cutter and on the same horizontal level therewith to form a cutter jaw through which tobacco is fed to said cutter drum and a rotary blade grinder disposed diametrically opposite said mouthpiece, a series of circumferentially spaced adjustable supports mounted on said cutter drum, a flat elongated cutter blade of a length slightly greater than the elongated mouthpiece supported on each of said adjustable supports, said cutter blades being disposed at a longitudinal inclination with respect to the axis of rotation and extending at an acute angle along a longitudinal plane to the axis of the drum, said blades being mounted for adjustment in a direction at right angles to the radius of the drum, and each of said blades being provided with an elliptically curved portion forming a cutting edge adapted to cooperate with said mouthpiece and being displaced a considerable distance from a radial line perpendicular to the blade and extending through the axis of the drum.

2. In combination with a tobacco cutting machine including a horizontal rotary cutter drum presented to an elongated horizontally extending mouthpiece forming a cutting jaw through which tobacco is fed and a blade grinder disposed diametrically opposite said mouthpiece, the axis of said drum being on the same horizontal level with said horizontally extending mouthpiece and grinder axis, a series of relatively wide flat cutter blades mounted on said rotary drum for adjustment in a direction at right angles to a radius extending through the axis of the drum and perpendicular to said blades, said blades being provided with elliptically curved edge portions forming a cutting edge from one end to the other of said blade, adjustable supports on said drum arranged to support each of said blades at an acute angle to the axis of said drum, and gearing connecting said supports for moving said blades in said direction of adjustment so that the remote edges of said blades will engage said mouthpiece jaw and grinder.

References Cited in the file of this patent

UNITED STATES PATENTS

| | | |
|---|---|---|
| 848,066 | Stewart et al. | Mar. 26, 1907 |
| 1,807,975 | Eyres | June 2, 1931 |
| 2,005,551 | MacDonald | June 18, 1934 |
| 2,181,781 | Caspersson | Nov. 28, 1939 |
| 2,399,529 | Willits | Apr. 30, 1946 |
| 2,476,177 | Bloom et al. | July 12, 1949 |
| 2,690,777 | Korber et al. | Oct. 5, 1954 |
| 2,735,469 | West | Feb. 21, 1956 |

FOREIGN PATENTS

| | | |
|---|---|---|
| 402,223 | Great Britain | Nov. 30, 1933 |